United States Patent
Mohanty et al.

(10) Patent No.: US 8,934,451 B2
(45) Date of Patent: Jan. 13, 2015

(54) DEREGISTRATION WITH CONTEXT RETENTION FOR INTER-RAT OPERATIONS

(75) Inventors: Shantidev Mohanty, Santa Clara, CA (US); Muthaiah Venkatachalam, Beaverton, OR (US); Avishay Sharaga, Bet Nehemya (IL); Pouya Taaghol, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 665 days.

(21) Appl. No.: 12/839,619

(22) Filed: Jul. 20, 2010

(65) Prior Publication Data

US 2011/0044307 A1 Feb. 24, 2011

Related U.S. Application Data

(60) Provisional application No. 61/275,266, filed on Aug. 24, 2009.

(51) Int. Cl.
*H04W 36/02* (2009.01)
*H04W 72/08* (2009.01)
*H04W 72/04* (2009.01)

(52) U.S. Cl.
CPC ........ *H04W 72/085* (2013.01); *H04W 72/0453* (2013.01); *Y02B 60/50* (2013.01)
USPC .......................................... 370/331; 455/442

(58) Field of Classification Search
CPC ............ H04W 36/0005–36/026; Y02B 60/43; Y02B 60/50
USPC ......................... 370/328–338; 455/435.1–444
See application file for complete search history.

(56) References Cited

U.S. PATENT DOCUMENTS

| 2007/0298725 | A1* | 12/2007 | Ryu ................................. 455/68 |
| 2009/0124260 | A1* | 5/2009 | Casati et al. .................. 455/436 |
| 2009/0280812 | A1* | 11/2009 | Cheng et al. .................. 370/331 |
| 2010/0056141 | A1* | 3/2010 | Marsan et al. ................ 455/434 |

FOREIGN PATENT DOCUMENTS

| WO | 2011/028538 A2 | 3/2011 |
| WO | 2011/028538 A3 | 6/2011 |

OTHER PUBLICATIONS

International Search Report and Written Opinion for International Patent Application No. PCT/US2010/046518, Mailed Apr. 29, 2011, 9 pages.
Soulhi, Said, "3G Wireless Networks Provisioning and Monitoring via Policy Based Management", Proceedings of ICCT 2003, pp. 1137-1143.
International Preliminary Report on Patentability and Written Opinion received for PCT Patent Application No. PCT/US2010/046518, mailed on Mar. 8, 2012, 6 pages.

* cited by examiner

*Primary Examiner* — Pao Sinkantarakorn
(74) *Attorney, Agent, or Firm* — Cool Patent, P.C.

(57) ABSTRACT

A method to perform deregistration with context retention is presented. In one embodiment, the method includes storing a context associated with a mobile station in response to a deregistration request from the mobile station. The method includes determining whether or not to accept the deregistration request with context retention and sending a deregistration command message to the mobile station if the deregistration request with context retention is allowed.

14 Claims, 6 Drawing Sheets

DEREGISTRATION WITH CONTEXT RETENTION FOR INTER-RAT OPERATIONS

CROSS-REFERENCE TO RELATED APPLICATIONS

This application claims the benefit of U.S. Provisional Application No. 61/275,266, filed on Aug. 24, 2009, entitled "Advanced Broadband Wireless Communication Systems And Methods", and the contents of which incorporated herein by reference as if set forth herein in full.

FIELD OF THE INVENTION

Embodiments of the invention relate to wireless communication systems; more particularly, embodiments of the invention relate to inter-RAT (Radio Access Technology) operations.

BACKGROUND OF THE INVENTION

Mobile Worldwide Interoperability for Microwave Access (WiMAX) is a broadband wireless access technology based on Institute of Electrical and Electronics Engineers (IEEE) 802.16 standard. Mobile WiMAX uses a scalable orthogonal frequency division multiple access (OFDMA) scheme to deliver wireless broadband packet data services to mobile terminals.

In current IEEE 802.16 based WiMAX networks, when a device performs disconnection from the WiMAX network, the device's context is removed from the network. For example, a device is capable of communicating with network system A and network system B. If the device determines that it is in the coverage area of both the systems, the device may decide to disconnect from system A and connect to system B for communication needs.

The device which disconnects from a network only to connect to another radio access technology (RAT) will have to perform full network entry when the device returns to the same network. It is likely that the device will suffer long latency during the process.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

A method to perform deregistration with context retention is presented. In one embodiment, the method includes storing a context associated with a mobile station in response to a deregistration request from the mobile station. The method includes determining whether or not to accept the deregistration request with context retention and sending a deregistration command message to the mobile station if the deregistration request with context retention is allowed.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for deregistration with context retention. Specifically, performing deregistration with context retention are discussed in reference to multi-core processor computer systems. However, the methods and apparatus for performing deregistration with context retention are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

A method to perform deregistration with context retention is presented. In one embodiment, the method includes storing a context associated with a mobile station in response to a deregistration request received from the mobile station. The method includes determining whether or not to accept the deregistration request with context retention. In one embodiment, the method includes sending a deregistration command message to the mobile station if the deregistration request with context retention (DCR) is allowed. Otherwise, in one embodiment, the method includes sending a deregistration command message to the mobile station with an indication that the context retention requested is not performed.

In one embodiment, when a mobile station moves from a WiMAX network to another radio access technology (RAT), the mobile station disconnected from the WiMAX network. The context of the mobiles station is maintained in one of the network entities if the deregistration is performed with context retention. While a mobile station is in the other RAT, the WiMAX network does not send paging message to the mobile station. When the mobile station returns to the WiMAX network, the mobile station performs or attempts to perform fast network re-entry using the stored context.

Figure 1:
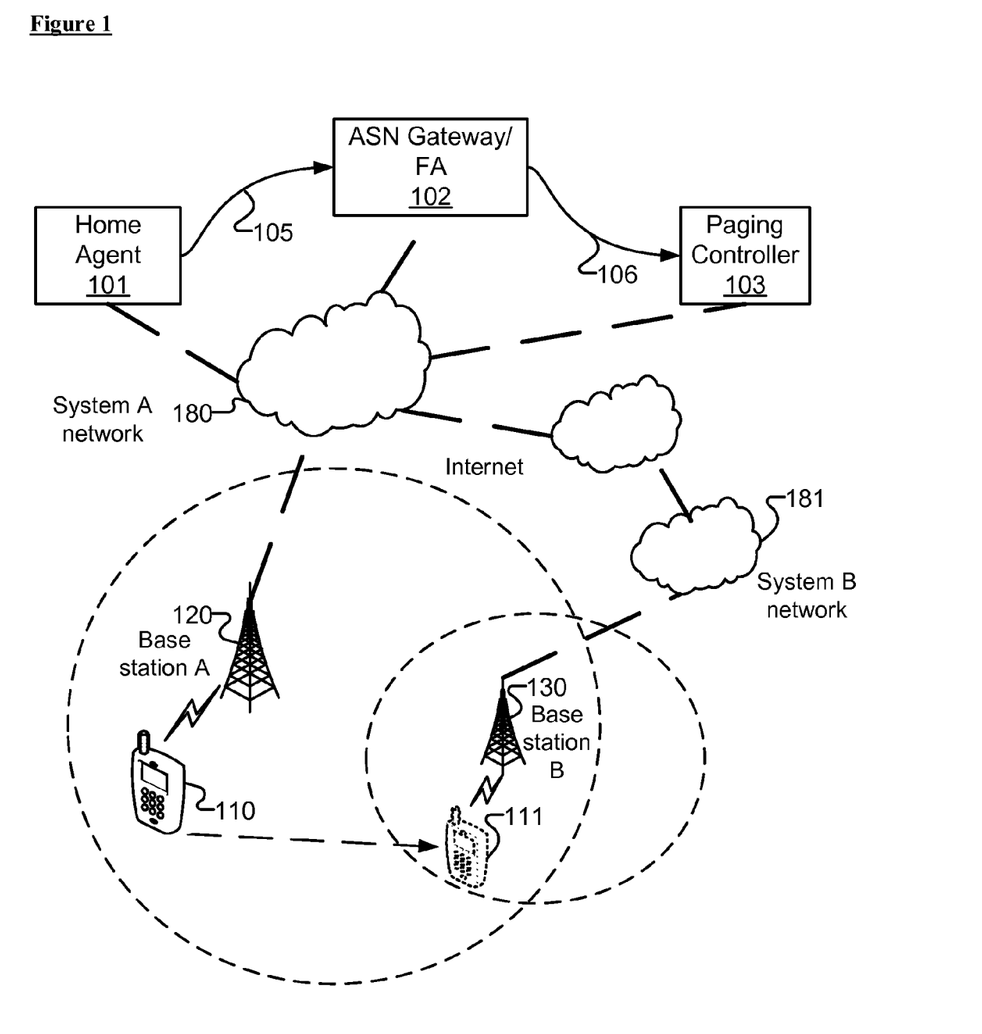
FIG. 1 is a block diagram of a communication system that shows a mobile device moving to another network, in accordance with one embodiment of the invention.

FIG. 1 is a block diagram of a communication system that shows a mobile device moving to another network, in accordance with one embodiment of the invention. Many related components have not been shown to avoid obscuring the invention. Referring to FIG. 1, in one embodiment, the communication system includes home agent 101, ASN gateway/FA 102, paging controller 103, system A network 180, system B network 181, base station 120, base station 130, and mobile station 110. In one embodiment, home agent 101 is a part of system A network 180.

In one embodiment, base stations 120-121 are advanced base stations (ABS) which supports the Advanced Air Interface protocol (AAI). In one embodiment, mobile station 110 is an advanced mobile station (AMS). Mobile station 110 is a subscriber station capable of performing communication in accordance with the AAI.

In one embodiment, a paging area includes a set of base stations (e.g., 20-40 base stations). In one embodiment, base station 120 is associated with system A network 180. Base station 130 is associated with system B network B 181. Mobile station 110 is capable of accessing both the networks.

In one embodiment, home agent 101 communicates with ASN gateway/FA 102 via link 105. ASN gateway/FA 102 communicates with paging controller 103 via link 106. Mobile station 110 communicates with system A network 180 via base station 120. Mobile station 110 communicates with system B network 181 via base station 130.

In one embodiment, mobile station 110 moves from system A network 180 to system B network 181. Mobile station 111 determines that it is still in the coverage area of both systems. Mobile station 111 decides to deregister from System A network 180 with context retention and connect to System B network 181. If mobile station 110 later decides to connect to System A network 180, the mobile station 110 may rely on the save context and is not required to perform a full network entry process. Some network entry steps are therefore skipped (not required to perform). This improves the initial network entry and provides a better user experience as if the network is always connected.

Contrasting to entering an idle mode, mobile station 110 need not wake up periodically (e.g., for every paging cycle) to report to base station A. Contrasting to a device that goes into a low power mode, mobile station 110 is not required to wake up to report for every listening paging cycle.

In one embodiment, mobile station 110 moves from IEEE 802.16 based WiMAX network to another system such as WiFi, 3GPP networks, etc. and then comes back to IEEE 802.16 based WiMAX network at a later time. Although the examples below are given with reference to an IEEE 802.16 based WiMAX network, the procedures may apply in conjunction with other communication systems, such as, for example, WiFi and 3GPP (Long Term Evolution) network.

Figure 2:
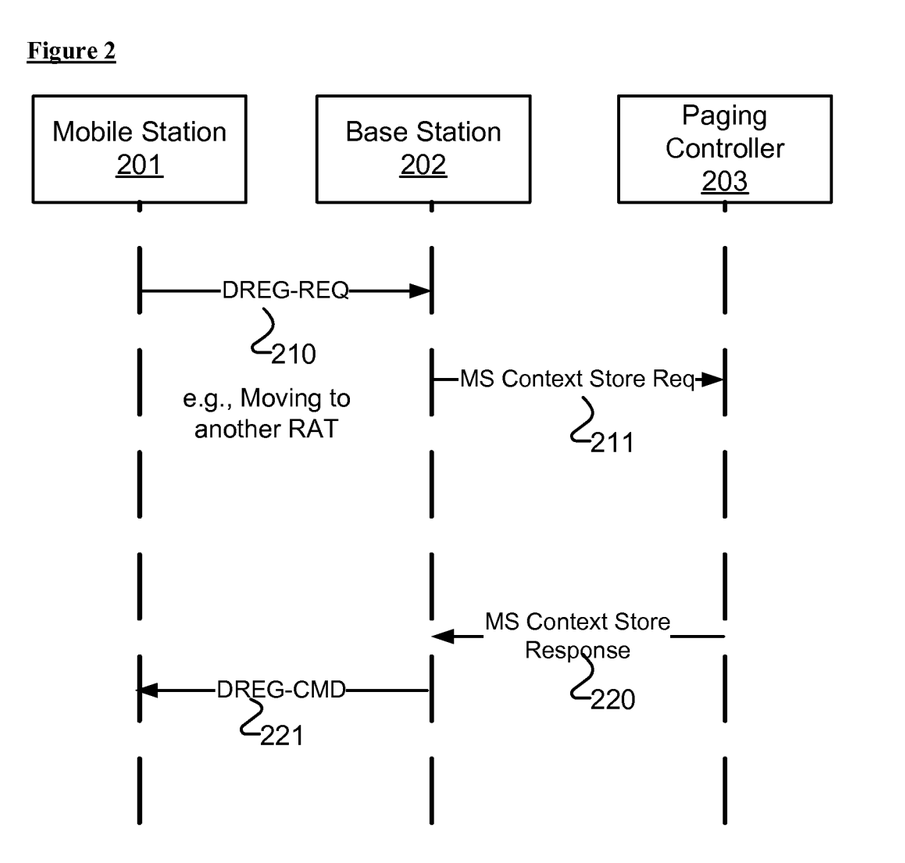
FIG. 2 shows a flow diagram of one embodiment of a process to disconnect from a network.

FIG. 2 shows a flow diagram of one embodiment of a process to deregister from a network. Referring to FIG. 2, in one embodiment, the system includes mobile station 201, base station 202, and paging controller 203.

In one embodiment, when mobile station 201 decides to deregister from System A (to move to System B). Mobile station 201 sends a deregistration request message (e.g., DREG-REQ 210) with the deregistration purpose as "moving to another RAT (radio access technology)" and with the frame-offset (with respect to the frame in which the deregistration request message is transmitted).

In one embodiment, base station 202 (of system A) receives the deregistration request from mobile station 201 (with "moving to another RAT" as the purpose), base station 202 collects context of mobile station 201. The context includes information, such as, for example, security keys, service flow parameters, QoS parameters, etc. Base station 202 stores the context locally or sends the context to another network entity, such as, for example, paging controller 203.

In one embodiment, if base station 202 stores the context in another network entity (e.g., paging controller 203), base station 202 sends a deregistration command message (e.g., DREG-CMD 221) to mobile station 201 after receiving the response message from the corresponding network entity. In one embodiment, base station 202 send a MS context store request 211 to paging controller 203. Base station 202 waits for a response (e.g., MS context store Response 220) from paging controller 203. Base station 202 replies to mobile station 201 on whether or not the context is stored successfully (e.g., DREG-CMD 221).

In one embodiment, if base station 202 stores the context locally, base station sends a deregistration command message (e.g., DREG-CMD 221) to mobile station 201 after storing the context. In this message, base station 202 indicates that context of mobile station 202 is stored successfully.

In one embodiment, the context is removed after a lapse of time. The duration of retention is extensible by negotiation. Mobile station 201 is able to send a request to extend the time-out.

In one embodiment, the deregistration with content retention (DCR) mode is a mode in which an AMS (e.g., mobile station 201) is deregistered from a network while its context is kept in a network entity as long as the Resource Retain Time is valid. While the Resource Retain Time is valid, the network retains AMS's information which is used to expedite AMS's network reentry. In one embodiment, a CRID (context retention identifier) is used to identify a mobile station which is associated with the DCR mode.

In one embodiment, an AMS initiates the DCR mode by transmitting an AAI_DREG-REQ message with the De-registration_Request_Code parameter set to "0x04", for example. The AMS requests the network to retain specific AMS service and operational information for DCR mode management purposes through inclusion of the Idle Mode Retain Information element in the AAI_DREG-REQ. If an ABS decides to allow the AMS's DCR mode request, ABS sends an AAI_DREG-RSP with action code "0x08" in the response to the AAI_DREG-REQ message. If the ABS decides to reject AMS's DCR mode request, the ABS sends an AAI_DREG-RSP with action code "0x09" in response to the AAI_DREG-REQ message. In another embodiment, an ABS will proceed with a deregistration request whether or not the context retention is performed and the ABS may not send a rejection regarding the context retention request.

In one embodiment, an AMS initiates the DCR mode in idle mode state by performing the location update in AAI_RNG-REQ message for transition to DCR mode. If the ABS decides to allow AMS's DCR mode request, the ABS sends a AAI_RNG-RSP with action code "0x04". If the ABS decides to reject AMS's DCR idle mode request, the ABS sends an AAI_RNG-RSP with action code "0x05".

In one embodiment, an AMS in DCR mode is able to extend the Resource Retain Time by sending a AAI_RNG-REQ message together with the CRID. This would extend the timer before the time expires. If the ABS decides to allow AMS's extension request, the ABS sends an AAI_RNG-RSP with location update response "0x04" in response to the AAI_RNG-REQ message. In one embodiment, if the ABS rejects AMS's extension request, the ABS sends an AAI_RNG-RSP with location update response="0x05" in response to the AAI_RNG-REQ message. In one embodiment, upon receiving the rejected indication in AAI_RNG-RSP, the AMS performs reentry to the network.

In one embodiment, when a mobile station is in idle mode the mobile station is required to wake up periodically. The mobile station receives a broadcast packet from a base station. Although the context of mobiles station in the idle mode is not deleted, the mobile station is required to perform a reentry if the mobile station receives a paging message. This is not possible if the mobile station has moved to another system (instead of remaining idle).

Figure 3:
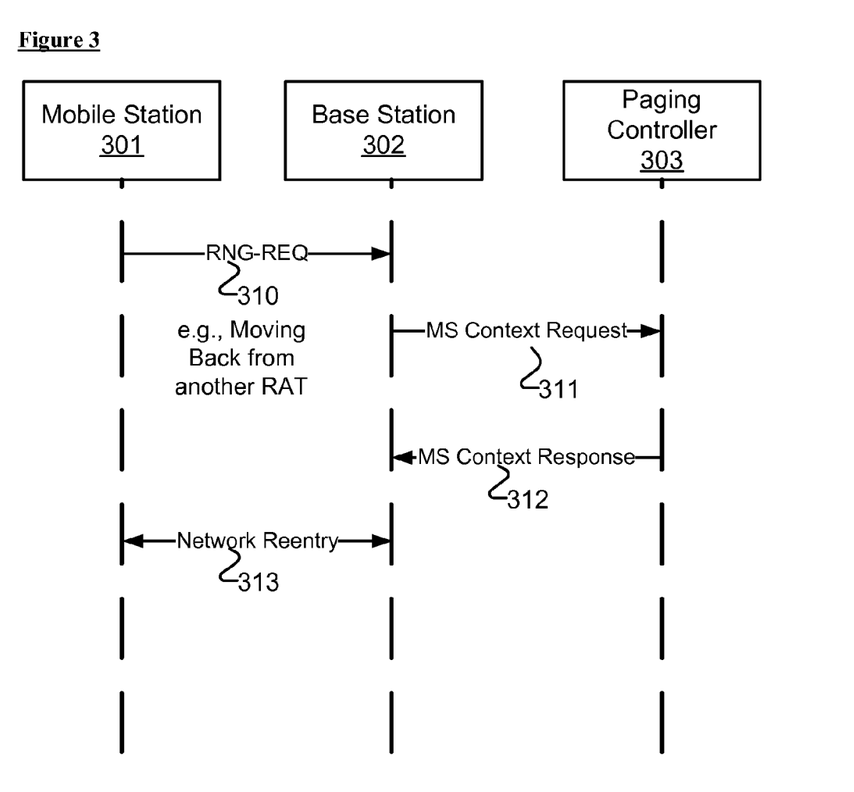
FIG. 3 shows a flow diagram of one embodiment of a process to reenter a network.

FIG. 3 shows a flow diagram of one embodiment of a process to reenter a network. Referring to FIG. 3, in one embodiment, the system includes mobile station 301, base station 302, and paging controller 303.

In one embodiment, when mobile station 301 decides to re-connect to System A, mobile station 301 sends a ranging request message (e.g., RNG-REQ 310) to base station 302 associated with system A. In this message, mobile station 301 indicates that the purpose of the request is to re-enter the system A. Mobile station 301 also includes its identity (e.g., CRID) in the ranging request message as well as the identity of base station where mobile station 301 was last connected. In one embodiment, base station 302 identifies mobile station 301 by the CRID. It will be appreciated by those skilled in the art that these messages may be referred to in different terminologies in accordance with different wireless communication standards.

In one embodiment, base station 302 sends a MS context request message (e.g., MS context request 311) to a network entity (e.g., paging controller 303). The network entity retrieves the mobile station 301's context from where it was stored. Paging controller 303, for example, sends a MS context response (e.g., MS context response 312) to base station 302 if the context is retrieved successfully. In one embodiment, the context is saved at base station 302 itself.

In one embodiment, with the context information restored, mobile station 301 is able to perform fast network entry.

In one embodiment, for the network reentry from the DCR mode, the AMS (e.g., mobile station 301) initiates network reentry with the ABS (e.g., base station 302) by sending an AAI_RNG-REQ message and the CRID.

In one embodiment, by storing mobile station 301's context, base station 302 skips some of the steps, such as, for example, registration, service flow establishment, IP address acquisition, etc. when mobile station enters System A. This reduces the network entry latency and provides better user experience.

In one embodiment, base station 302 receives the context response and determines which the parameters are still valid. Base station 302 is able to send the valid parameters to mobile station 301. Base station 302 is able to perform negotiation with mobile station 301 for the remaining parameters which are not longer valid.

In one embodiment, without the context retention, the latency to enter a network is, for example, 5-10 s. The latency to reenter a network is reduced if a mobile station performed a deregistration with context retention.

Figure 4:
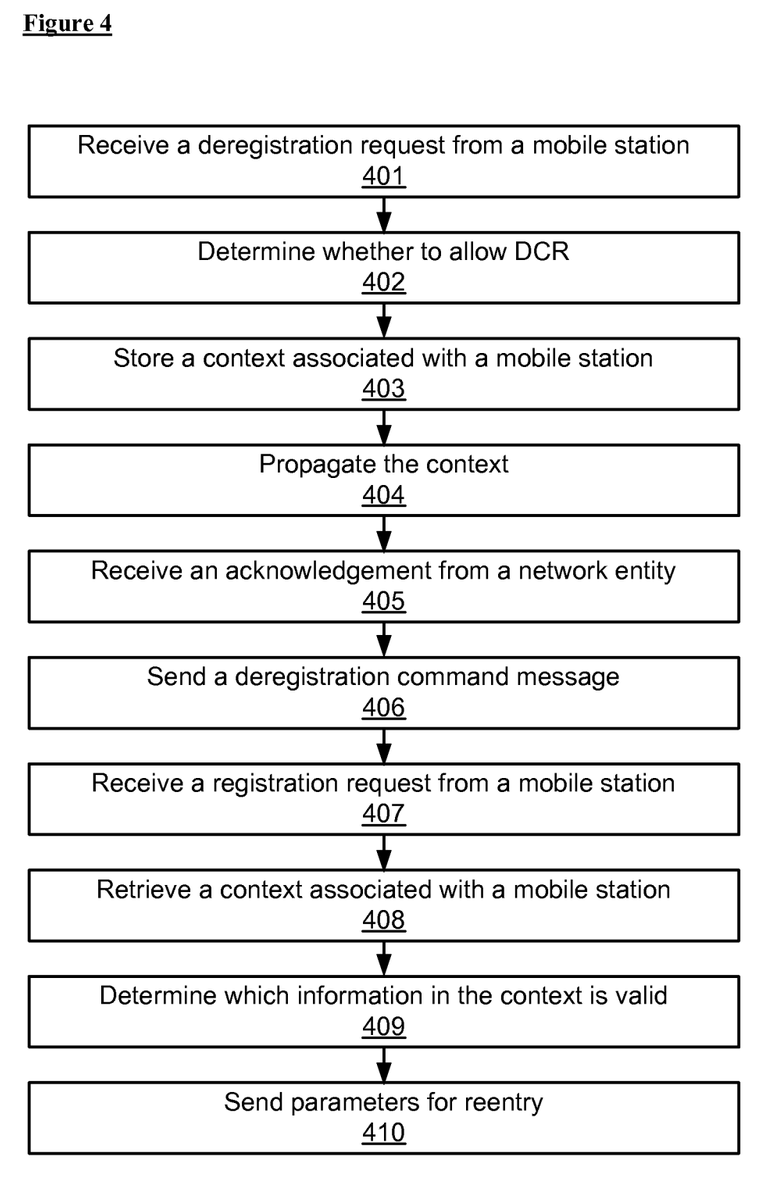
FIG. 4 is a flow diagram of one embodiment of a process to perform deregistration with context-retention.

FIG. 4 is a flow diagram of one embodiment of a process to perform context-retention deregistration. The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., base station 120 with respect to FIG. 1). In one embodiment, the process is performed by a computer system with respect to FIG. 6.

Referring to FIG. 4, in one embodiment, processing logic begin by receiving a deregistration request from a mobile station (process block 401). The deregistration request is received in a deregistration request message.

In one embodiment, processing logic determines whether or not to accept the deregistration request with context retention (process block 402).

In one embodiment, processing logic stores a context associated with the mobile station (process block 403). In one embodiment, the context and the mobile station is associated with a context retention identifier (CRID). In one embodiment, the context includes security keys, service flow parameters, and quality of service (QoS) parameters associated with a connection established by the mobile station. The context is communicated in the format of one or more information elements. In one embodiment, processing logic saves the context for a period of duration. The mobile station is not required to respond to a paging message during the first period of duration. The period is extendable upon a request from the mobile station.

In one embodiment, processing logic propagates the context to be stored at a network entity (process block 404).

In one embodiment, processing logic receives an acknowledgement from the network entity that the context has been successfully stored (process block 405). Processing logic sends a deregistration command message to the mobile station if the deregistration request with context retention is successful (process block 406). Otherwise, processing logic sends a rejection if the deregistration request with context retention is not allowed (or unsuccessful). In another embodiment, processing logic will proceed with the deregistration request whether or not the context retention is performed and processing logic may not send a rejection regarding the context retention request.

does not send a rejection regarding the context retention request but will proceed with deregistration request.

In one embodiment, processing logic receives a registration request (process block 407). The registration request is sent in a ranging registration request. The mobile station may reenter via a different base station within a same paging area. Processing logic retrieves a context associated with a mobile station (process block 408). In one embodiment, processing logic receives the context from a paging controller if the context is stored thereon. The context is identifiable by a context retention identifier associated with the mobile station.

In one embodiment, processing logic determines which information in the context is valid (process block 409). Processing logic allows reentry if part or all the information remains valid. The latency for the reentry is shorter than it would be if the context is not retained.

In one embodiment, processing logic sends one or more parameters in the context to the mobile station so that the mobile station proceeds with reentry (process block 410). In one embodiment, processing logic generates a response to communicate one or more parameters which are valid to the mobile station and which are to be negotiated with the mobile station. In one embodiment, processing logic sends a rejection response if the context is not available or has expired. In another embodiment, if the context is not available or has expired, processing logic continue with a network entry procedure without sending a rejection.

Figure 5:
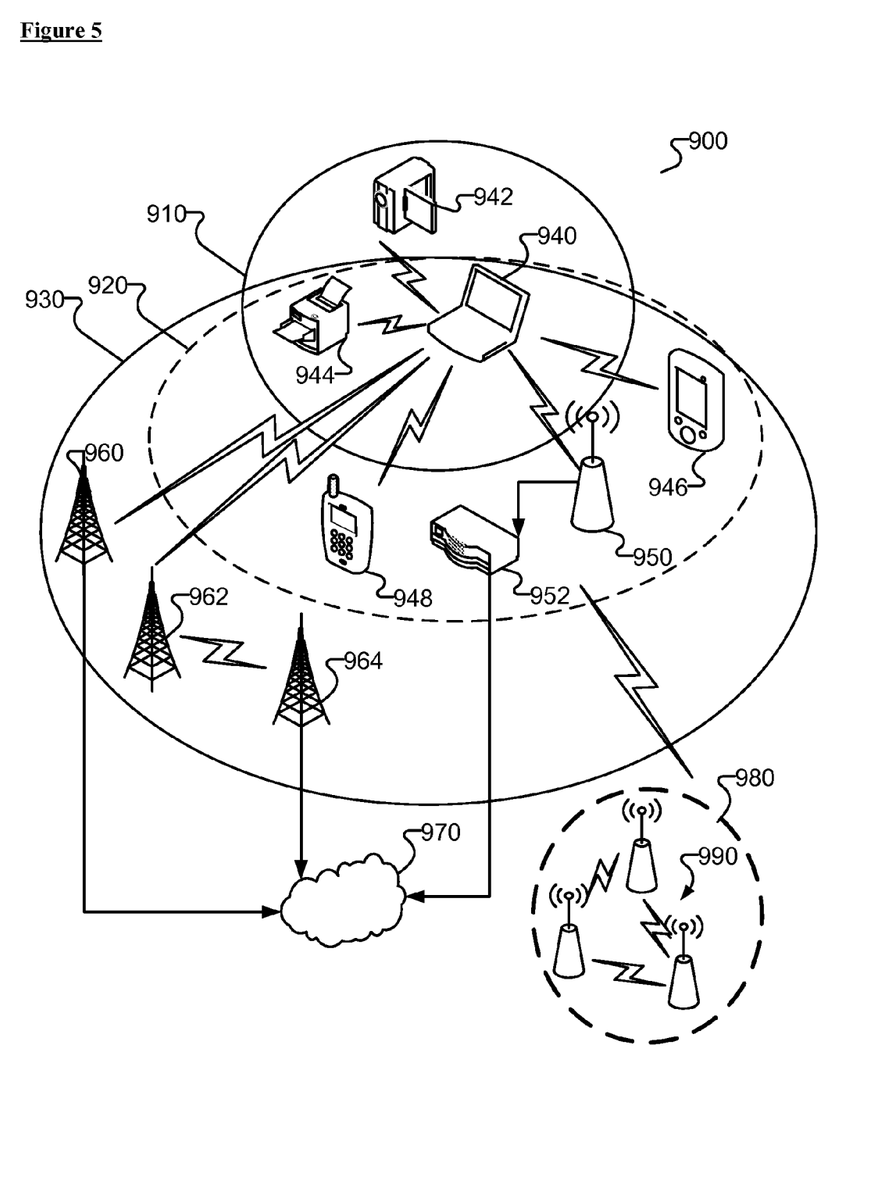
FIG. 5 is a diagram representation of a wireless communication system in accordance with one embodiment of the invention.

FIG. 5 is a diagram representation of a wireless communication system in accordance with one embodiment of the invention. Referring to FIG. 5, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct sequence spread spectrum (DSSS) modulation, frequency hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 5 depicts a WPAN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 6:
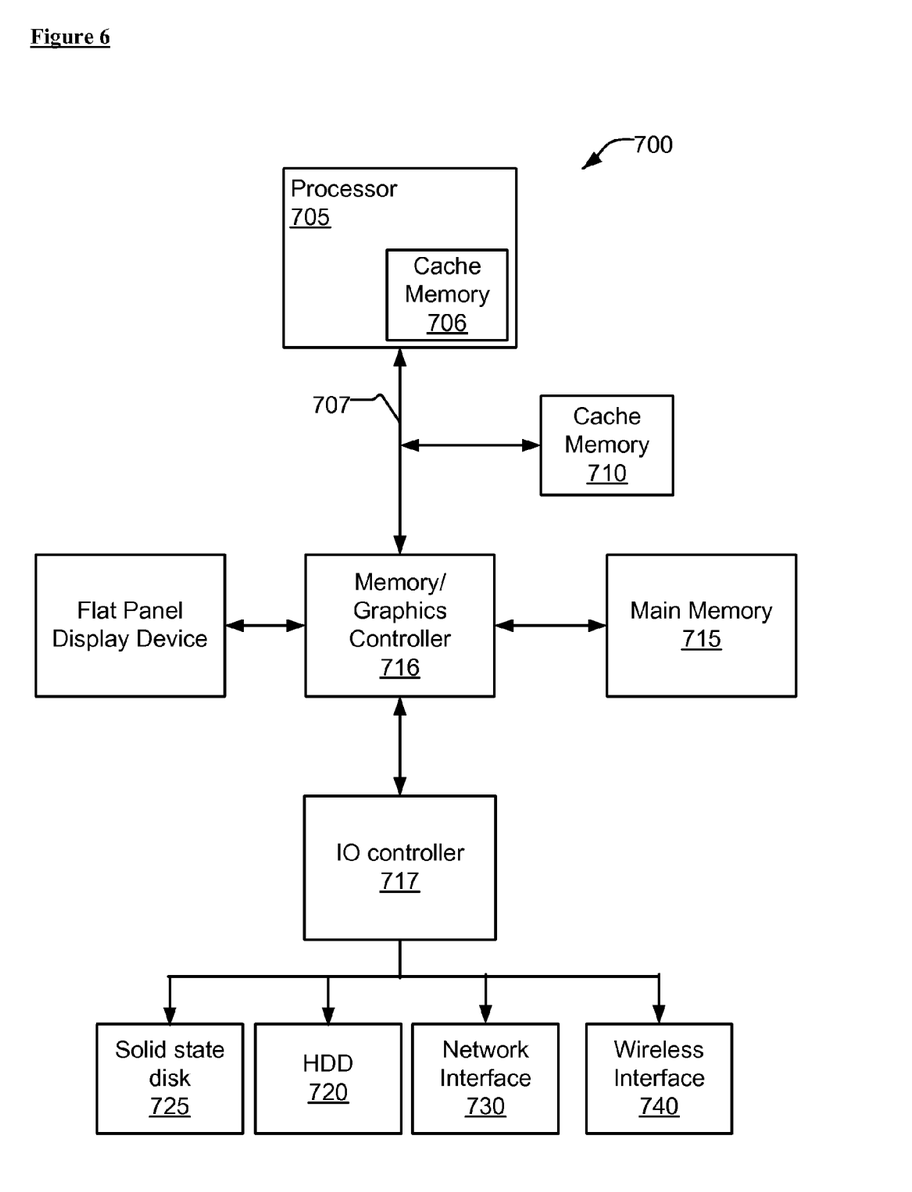
FIG. 6 illustrates a computer system for use with one embodiment of the present invention.

FIG. 6 illustrates an example of a computer system in conjunction with one embodiment of the invention. Processor 705 accesses data from level 1 (L1) cache memory 706, level 2 (L2) cache memory 710, and main memory 715. In one embodiment, cache memory 710 is a shared cache for more than one processor core.

In one embodiment, memory/graphic controller 716, 10 controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
  receiving a deregistration request from a mobile station;
  determining whether or not to accept the deregistration request with context retention;
  storing, in response to the deregistration request from the mobile station, a context associated with the mobile station and a frame-offset with respect to a frame in which the deregistration request is transmitted, wherein the context and frame-offset is stored while the mobile station is registered with another radio access technology; and sending a deregistration command message to the mobile station if the deregistration request with context retention is allowed, wherein the deregistration command message indicates to the mobile station that the context and the frame-offset is stored successfully.

2. The method of claim 1, further comprising:
propagating the context to be stored at a network entity; and
receiving an acknowledgement from the network entity that the context has been successfully stored.

3. The method of claim 1, further comprising sending a rejection if the deregistration request with context retention is not allowed.

4. The method of claim 1, wherein the context and the mobile station is associated with a context retention identifier (CRID).

5. The method of claim 1, wherein the deregistration request is received in a deregistration request message.

6. The method of claim 1, wherein the context comprises security keys, service flow parameters, and quality of service (QoS) parameters associated with a connection established by the mobile station.

7. The method of claim 1, wherein the context, in the format of one or more information elements, comprises service and operational information associated with a connection established by the mobile station.

8. The method of claim 1, further comprising saving the context for a first period of duration such that the mobile station is not required to respond to a paging message during the first period of duration, wherein the first period is extendable upon a request from the mobile station.

9. A method comprising:
sending a deregistration request with an indication to perform context retention, wherein the context is to be retained while registered with a different radio access technology;
sending a frame-offset with respect to a frame in which the deregistration request is transmitted;
receiving a response indicative of a successful context and frame-offset retention; and
performing deregistration if the context and frame-offset retention is successful, and registering with the different radio access technology while the context and frame-offset is retained.

10. The method of claim 9, wherein the deregistration request is to be sent to a first network in response to a decision to establish a connection via another radio access technology (RAT) during inter-RAT operations.

11. The method of claim 9, wherein the deregistration request is to be sent to a first network, wherein a response to a paging message with respect to the first network is no longer required after the deregistration.

12. The method of claim 9, further comprising:
sending a reentry request, prior to disconnecting from the RAT;
receiving context information, propagated from a base station, based on information retained during the context retention; and
performing network entry based on the context information.

13. A network system comprising:
a processor;
a memory coupled to the processor; and
a communication device, coupled to the processor to
receive a deregistration request from a mobile station;
determine whether or not to accept the deregistration request with context retention;
store, in response to the deregistration request from the mobile station, a context associated with the mobile station and a frame-offset with respect to a frame in which the deregistration request is transmitted, wherein the context and frame-offset is to be stored while the mobile station is registered with another radio access technology;
propagate the context and frame-offset to be stored by a paging controller;
receive an acknowledgement from the paging controller that the context and the frame-offset has been successfully stored; and
send a deregistration command message to the mobile station if the deregistration request with context retention is allowed, wherein the deregistration command message indicates to the mobile station that the context of the mobile station and the frame offset is stored successfully.

14. The system of claim 13, wherein the system is operable to
retrieve, in response to a registration request, the context associated with the mobile station;
send one or more parameters in the context to the mobile station so that the mobile station proceeds with reentry; and
send a rejection response if the context is not available or has expired.

* * * * *